Patented July 10, 1951

2,560,160

UNITED STATES PATENT OFFICE 2,560,160

STABILIZATION OF POLYMERIC RESINS WITH BISMUTH SALTS

Franz Sam Deutsch, Richmond, and Leonard Harvey Pocock Weldon, Hughenden, Cart Bridge, Send, England, assignors to British Resin Products Limited, London, England, a British company No Drawing. Application April 12, 1948, Serial No. 20,604. In Great Britain April 23, 1947

10 Claims. (Cl. 260—45.75)

The present invention relates to the stabilisation of polymerisation products which contain chlorine, and in particular to the stabilisation of the polymers of vinyl chloride and vinylidene chloride and their copolymers with each other and with other copolymerisable compounds such as vinyl acetate and ethyl maleate.

It is well known that chlorine-containing polymers and copolymers split off hydrogen chloride during heat treatment in the course of compounding and in subsequent forming operations such as calendering, moulding and extruding. Evolution of hydrogen chloride also takes place on ageing of articles made from these polymers. The decomposition occurs even at ordinary room temperature, and is accelerated by exposure to light. It is essential to restrict the evolution of hydrogen chloride to the lowest possible amount and to remove all the hydrogen chloride as soon as it is formed, because of the deleterious effect on appearance and other important properties. It causes darkening of the surface of the finished compositions, greatly impairs their electrical and mechanical properties, and may even lead to attack on the surface of the mixing or forming equipment. Such an attack would show in corrosion of injection or compression moulds and/or of injection cylinders and extrusion dies. There is also evidence that the presence of even minute quantities of hydrogen chloride catalyses further decomposition.

Stabilisation by various materials capable of neutralising the hydrogen chloride has been proposed. Lead compounds have frequently been used, but their high toxicity is a disadvantage. The purely organic compounds which have been proposed show only limited heat stability in themselves, and are in some cases volatile. They therefore do not confer adequate stability on the chlorine-containing compositions. Compounds containing metals other than lead have been proposed, and in some cases show reasonable stabilising action.

According to the present invention a heat-stable resinous composition comprises a synthetic resin including a multiplicity of vinyl and/or vinylidene chloride units in its molecular structure, and a bismuth salt of an organic acid in an amount of 0.5% to 10% by weight of the resinous composition.

Many of the bismuth salts of organic acids are non-toxic, and those which are compatible with the afore-mentioned polymers and copolymers and whose reaction products with hydrogen chloride are also compatible with the polymers and copolymers, give stabilised compositions of high transparency. The bismuth salts of fatty acids having at least 12 carbon atoms show this advantage when used in an amount of 0.5–4% by weight of the composition, and are therefore preferred. All types of bismuth organic acid salts may be employed, and there may be mentioned the formate, acetate, butyrate, crotonate, laurate, palmitate, stearate, oleate, citrate, tartrate, maleate, benzoate and phthalate.

The synthetic resins susceptible to heat-stabilisation by means of these salts are not only the polymers of vinyl and vinylidene chloride but also their copolymers with one another and with other copolymerisable compounds, such copolymers incorporating two, three or more different monomeric units. Examples of copolymerisable compounds include vinyl esters of organic acids such as vinyl acetate, vinyl methoxybutyrate and vinyl laurate, esters of acrylic, alpha chloracrylic and alpha methacrylic acid with alkyl and cycloalkyl radicals of six or less carbon atoms, such as cyclohexyl methacrylate, butyl acrylate and ethyl chloracrylate, diesters of itaconic, maleic and fumaric acids with alkyl and cycloalkyl radicals of six or less carbon atoms, acrylonitrile and methacrylonitrile, crotononitrile and vinyl hydrocarbons such as styrene and its chlor- and lower alkyl nuclear substituted derivatives such as p-chlorostyrene, vinyl xylene and ethyl styrene. The stabilising action of the bismuth salts is evident even when the resin molecules contain a minor proportion of the vinyl and/or vinylidene chloride units but is much more pronounced when a major proportion of these units is present, and the use of the bismuth organic acid salts with resins of the latter type is preferred.

The compositions of this invention may include the usual plasticisers, fillers, pigments, dyes and lubricants in addition to the chlorine-containing polymers and/or copolymers as above defined.

The following examples illustrate the preparation and testing of resinous mixtures having compositions falling within the scope of this invention, and also show, by way of comparison, the behaviour of similar compositions from which the stabilising bismuth organic acid salt has been omitted. In these examples, the parts and percentages referred to are by weight, and the milling referred to was carried out on differential speed open rolls maintained at the two temperatures referred to in each case.

Example 1

9.00 kilograms of commercial polyvinyl chloride were mixed with 6.00 kilograms of dibutyl phthalate and 0.375 kilogram of bismuth stearate. The mixture was milled on open rolls at a roll temperature of 145° and 140° C. until the mass was uniformly gelled, which required 25–30 minutes. The resulting composition was cut out from the rolls in strips of approximately 12 x 6 x ⅛" and fed directly to a 4-bowl calender. They were then calendered at 130° C. to give a finished sheet or film of 0.005–0.007" thickness. The resulting sheets were smooth, practically colourless, highly transparent and showed excellent light stability. The heat stability was tested before calendering by heating a ⅛" strip for 10 minutes at 170° C. between mild steel plates. After this severe test, the composition containing bismuth stearate showed no colour change, whereas a similar composition from the same ingredients without bismuth stearate showed severe discolouration after a five minutes' exposure to the same temperature.

Example 2

70 parts of a copolymer of 96% vinyl chloride with 4% of vinylidene chloride, 30 parts of dibutyl phthalate and 3 parts of bismuth crotonate were milled together for 3 minutes on rolls at 150° and 130° C. to give a ⅛" thick translucent sheet. On testing for heat stability as in Example 1 for 10 minutes at 155° C., practically no discolouration resulted, while strips of an otherwise similar composition but containing no bismuth salt acquired a red-brown colour in this test.

Example 3

80 parts of a copolymer of 82% vinyl chloride with 18% vinylidene chloride, 20 parts of dibutyl phthalate, 1 part of calcium stearate (lubricant) and 3 parts of bismuth formate were milled together for 3 minutes on rolls at 120° and 100° C., to give a ⅛" thick translucent sheet. A strip of this sheet, heated between mild steel plates at 160° C. for 10 minutes showed no discolouration, while a strip of a similar composition but containing no bismuth salt was coloured dark brown after this treatment.

Example 4

80 parts of a copolymer of 87% vinyl chloride with 13% vinyl acetate, 1 part of calcium stearate and 8.5 parts of bismuth sodium tartrate were milled together and tested for heat stability substantially as in Example 3, the test being carried out at 155° C., and extended to 15 minutes. At the end of this time, no discolouration resulted, but a strip of similar composition containing no bismuth salt was coloured pink and slightly charred after 15 minutes under these conditions.

Example 5

85 parts of a copolymer of 85% vinylidene chloride with 7.5% vinyl chloride and 7.5% diethyl maleate, 15 parts of tricresyl phosphate, 1 part of calcium stearate and 3 parts of bismuth sodium tartrate were milled together for 2 minutes on rolls at 170° C. and 160° C., to give a ⅛" thick transparent sheet, and the heat stability of the composition was tested as in Example 3. No discolouration resulted, but a strip of similar composition containing no bismuth salt was charred in the test.

Example 6

300 parts of a copolymer of 94% vinyl chloride with 6% vinyl acetate, 150 parts of dibutyl phthalate and 12 parts of bismuth oleate were milled together for 5 minutes on rolls at 160° and 140° C., to give a transparent, ⅛" thick sheet. Heating a strip of this sheet between mild steel plates for 10 minutes at 170° C. did not result in discolouration, while a similar strip of a composition differing only in the absence of a bismuth salt was coloured yellow at the end of the test.

Example 7

95 parts of a copolymer of 90% vinyl chloride with 10% vinyl acetate, 5 parts of dibutyl phthalate and 1 part of bismuth stearate were milled together for 3 minutes on rolls at 130° C. and 120° C., to give a transparent, ⅛" thick sheet. A strip of this sheet, when heated for 10 minutes between mild steel plates at 160° C., did not discolour, while a similar strip of a composition differing only in the absence of a bismuth salt was coloured brown after 5 minutes between the steel plates.

The compositions of this invention are adapted, by virtue of their heat stability, to undergo the manipulations and heat treatment involved in the manufacture of articles such as calendered sheet, mouldings and extruded forms and, by virtue of their non-toxicity where the acid radical in the bismuth salt is itself non-toxic, articles may be produced from these compositions which are suitable for use in conjunction with foodstuffs and in close contact with the human skin.

We claim:

1. A heat-stable resinous composition, comprising a synthetic resin selected from the group consisting of vinyl chloride polymers and vinylidene chloride polymers, and a miscible bismuth salt of an organic carboxylic acid in an amount of 0.5% to 10% by weight of said resinous composition in homogeneous admixture therewith.

2. A non-toxic, transparent and heat-stable resinous composition comprising a synthetic resin selected from the group consisting of vinyl chloride polymers and vinylidene chloride polymers, and a miscible bismuth salt of a fatty acid having at least 12 carbon atoms in the molecule in an amount of 0.5% to 4% by weight of said resinous composition in homogeneous admixture therewith.

3. A heat-stable resinous composition comprising a polyvinyl chloride resin, and a miscible bismuth salt of an organic carboxylic acid which contains no more than three carboxylic groups in an amount of 0.5% to 10% by weight of said resinous composition in homogeneous admixture therein.

4. A heat-stable resinous composition comprising a polyvinylidene chloride resin, and a miscible bismuth salt of an organic carboxylic acid which contains no more than three carboxylic groups in an amount of 0.5% to 10% by weight of said resinous composition in homogeneous admixture therein.

5. A heat-stable resinous composition comprising polyvinyl chloride and, as a stabilizer therefor, bismuth stearate in an amount of 0.5% to 10% by weight of said resinous composition in homogeneous admixture therein.

6. A heat-stable resinous composition comprising a copolymer of vinyl chloride and vinylidene chloride and, as a stabilizer therefor, bismuth crotonate in an amount of 0.5% to 10% by weight of said resinous composition in homogeneous admixture therein.

7. A heat-stable resinous composition comprising a copolymer of vinyl chloride and vinylidene chloride and, as a stabilizer therefor, bismuth formate in an amount of 0.5% to 10% by weight of said resinous composition in homogeneous admixture therein.

8. A heat-stable resinous composition comprising a copolymer of vinyl chloride and vinyl acetate and, as a stabilizer therefor, bismuth sodium tartrate in an amount of 0.5% to 10% by weight of said resinous composition in homogeneous admixture therein.

9. A heat-stable resinous composition comprising a copolymer of vinyl chloride and vinylidene chloride and, as a stabilizer therefor, bismuth sodium tartrate in an amount of 0.5% to 10% by weight of said resinous composition in homogeneous admixture therein.

10. A heat-stable resinous composition comprising a copolymer of vinyl chloride and vinyl acetate and, as a stabiliser therefor, bismuth oleate in an amount of 0.5% to 10% by weight of the said resinous composition in homogeneous admixture therein.

FRANZ SAM DEUTSCH.
LEONARD HARVEY POCOCK WELDON.

REFERENCES CITED

The following references are of record in the file of this patent:

UNITED STATES PATENTS

| Number | Name | Date |
|---|---|---|
| 2,314,466 | Thwaites | Mar. 23, 1943 |

OTHER REFERENCES

Hackh's Chemical Dictionary, 3rd ed., 1944, page 895.